US012236185B2

(12) United States Patent
Jayaraj Devadoss et al.

(10) Patent No.: US 12,236,185 B2
(45) Date of Patent: Feb. 25, 2025

(54) METHODS AND SYSTEMS FOR ADDING ANNOTATIONS FROM A PRINTED VERSION OF A DOCUMENT TO A DIGITAL VERSION OF THE DOCUMENT

(71) Applicant: XEROX CORPORATION

(72) Inventors: Shoban Kumar Jayaraj Devadoss, Chennai (IN); Sainarayanan Gopalakrishnan, Chennai (IN); Rajasekar Kanagasabai, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/689,246

(22) Filed: Mar. 8, 2022

(65) Prior Publication Data

US 2023/0289515 A1 Sep. 14, 2023

(51) Int. Cl.
*G06F 40/169* (2020.01)
*H04N 1/32* (2006.01)

(52) U.S. Cl.
CPC ....... *G06F 40/169* (2020.01); *H04N 1/32144* (2013.01)

(58) Field of Classification Search
CPC .................................................... G06F 40/169
See application file for complete search history.

(56) References Cited

U.S. PATENT DOCUMENTS

| 10,460,023 | B1* | 10/2019 | Shriver | G06F 40/117 |
| 10,764,448 | B1* | 9/2020 | Nakamura | G06V 30/2455 |
| 2002/0049787 | A1* | 4/2002 | Keely | G06F 40/169 |
| | | | | 715/205 |
| 2017/0060406 | A1* | 3/2017 | Rucine | G06V 30/1423 |
| 2020/0202155 | A1* | 6/2020 | Ikeda | G06V 30/413 |
| 2022/0122367 | A1* | 4/2022 | O'Gara | G06F 16/5846 |

FOREIGN PATENT DOCUMENTS

JP 2012203491 A * 10/2012

* cited by examiner

*Primary Examiner* — Scott T Baderman
*Assistant Examiner* — Seung Woon Jung
(74) *Attorney, Agent, or Firm* — Jones Robb, PLLC

(57) ABSTRACT

The present disclosure discloses methods and systems for adding one or more annotations from a printed version of a document to a digital version of the document. The methods and systems include receiving the printed document with one or more annotations, which represent review comments of a reviewer. The printed document including one or more annotations is scanned to obtain a scanned document. Thereafter, the scanned document is compared with the original digital version of the document to identify the one or more annotations. The identified one or more annotations are then extracted and added to the digital version of the document to obtain a new digital version, which can be used for changes by the user or any other user.

18 Claims, 11 Drawing Sheets

METHODS AND SYSTEMS FOR ADDING ANNOTATIONS FROM A PRINTED VERSION OF A DOCUMENT TO A DIGITAL VERSION OF THE DOCUMENT

TECHNICAL FIELD

The present disclosure relates to systems and methods for adding annotations from a printed version of a document to a digital version of the document.

BACKGROUND

Typically, organizations follow a review process to ensure the quality of work products such as client work products, or internal work products to be submitted to senior officials. In many situations, a user working on a document wants someone else to review the document. For example, a finance team member working on a company's annual report wants a senior team member to review the report before submission to directors or finance heads. In another example, a design team working on a new product design submits the design to a senior company official for review before submitting the design for production. In all such scenarios, the person who reviews these reports/designs prefers to do the review on a printed document, as reviewing the printed/paper document is considerably faster and easier than doing the review in a digital version of the document. For example, the reviewer can easily mark any portions in the document, scribble notes, strike-off content, make changes to diagrams on the paper, and so on.

Once the reviewer completes his review on the printed document, he submits the document/report having his handwritten comments to the user, who submitted the document for review. The user then refers to the comments given by the reviewer on the printed version and makes changes in the original digital document. Here, the user manually looks at the printed document and makes changes in the digital document based on the reviewer's comments. This approach requires significant time and effort from the user as the user has to refer to both the documents in parallel to make changes in the original document. This may frustrate the user sometimes. Moreover, the user may miss referring to certain comments while switching between the two documents, which may inadvertently leave some errors or discrepancies in the digital document. In this light, there is a need for improved methods and systems for managing documents having reviewer's comments.

SUMMARY

According to aspects illustrated herein, a method for adding annotations from a printed version of a document to a digital version of the document is disclosed. The method includes receiving the printed version of the document having one or more annotations from a user. Once received, the printed version of the document including the one or more annotations is scanned to obtain a scanned document. Thereafter, the one or more annotations are identified from the scanned document. The one or more annotations are then segregated into textual and non-textual annotations based on a calculated confidence value of each annotation. Finally, the one or more annotations are added to the digital version of the document based on the confidence value of the one or more annotations, for any changes in the digital version of the document based on the one or more annotations.

According to further aspects illustrated herein, a multi-function device for adding annotations from a printed version of a document to a digital version of the document is disclosed. The multi-function device includes a scanner for scanning the printed version of a document having one or more annotations. The multi-function device further includes a document manager for identifying the one or more annotations from the scanned document. The document manager is for segregating the one or more annotations into textual and non-textual annotations based on a calculated confidence value of each annotation and adding the identified one or more annotations to the digital version of the document, based on the confidence value of the one or more annotations. This results in a new digital version of the document having the one or more annotations. The document manager can further send the new digital version of the document having the one or more annotations to the user for any changes in the new digital version based on the added one or more annotations.

According to further aspects illustrated herein, a non-transitory computer-readable medium includes instructions executable by a processor to receive a printed version of a document having one or more annotations from a user. Once received, the printed document including the one or more annotations is scanned to generate a scanned document. Upon scanning, the one or more annotations are identified from the scanned document. The one or more annotations are segregated into textual or non-textual annotations based on a calculated confidence value of each annotation. Finally, the identified one or more annotations are added to the digital version of the document based on the confidence value of the one or more annotations, for any changes in the digital version of the document based on the one or more annotations.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
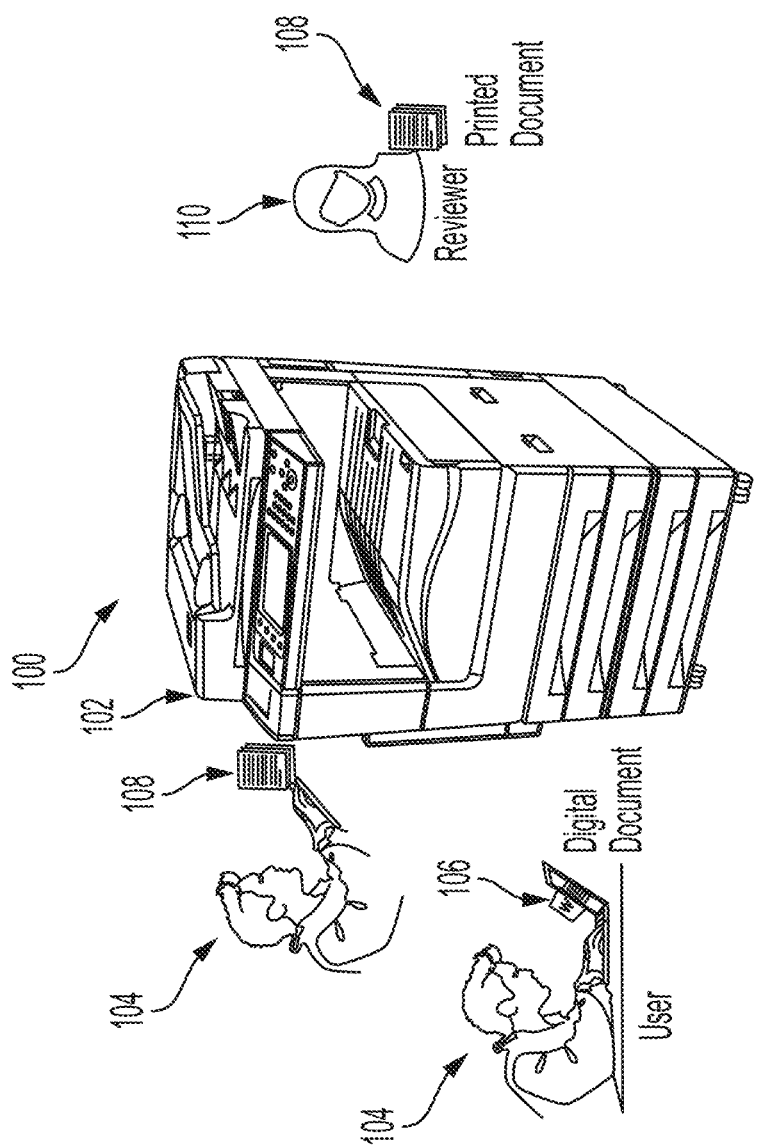
FIG. 1 shows an exemplary environment in which various embodiments of the present disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples in addition to the examples provided below.

The term "multi-function device" is a single device or a combination of multiple devices, to perform one or more functions such as, but not limited to, printing, imaging, scanning, copying, or the like. The multi-function device may include software, hardware, firmware, or a combination thereof. In the context of current disclosure, the multi-function device manages one or more annotations, for example, hand-written annotations provided by a user. Specifically, the multi-function device adds the one or more annotations from a printed version of a document to a digital version of the document. The addition of annotations in the digital version of the document allows the user or any user to make revisions in the document without the need to refer to the printed version.

The term "user" refers to the one who submits a document to another user for review. The user who reviews the document may be referred to as a reviewer. In other examples, the user and the reviewer may refer to a single person, where the user self-reviews the document.

The term "document" refers to any document which is created by the user for further review. The document in a digital format is referred to as a digital version of the document. The document can be in any digital format such as PDF, MS Word, MS Excel, PowerPoint, Photoshop, and so on. The document in the digital format may also be referred to as an original document and is without any annotations. The document when printed by the user for review is referred to as a printed version of the document. The new digital version of the document refers to the digital document having the one or more annotations.

The term "printed" in the context of document refers to a physical version of the document generated upon printing a digital version of the document. In the context of the disclosure, the printed version of the document is submitted for review and the reviewer provides his input by adding annotations on the printed version of the document.

The term "one or more annotations" refer to comments provided by the reviewer in the printed version of the document. The annotations are hand-written annotations. The annotations can be textual or non-textual annotations. For instance, characters, words, phrases, sentences, and so on are examples of textual annotations. And the non-textual annotations include symbols, labels, and signs such as strikethrough, underlines, highlights, encircling, and so on.

The term "confidence value" refers to a value that indicates a level of accuracy with which a hand-written annotation is identified/recognized. In the context of the disclosure, the confidence value is calculated for each annotation to determine its accuracy of identification. Further, the calculated value is compared with a pre-defined confidence value to determine whether an annotation is identified accurately or not.

Overview

The present disclosure discloses methods and systems for adding annotations from a printed version of a document to a digital version of the document. The annotations can be added by any user, for example, a user who is working on the document or a user who reviews the document. The annotations are added in the digital document such that the user can make any changes in the document based on the added annotations. This way, the person working on the document can conveniently and efficiently make required changes/revisions based on the added annotations without the need to refer to the printed version of the document having annotations. Moreover, the system is trained based on the changes/revisions made by the user such that the system can recognize similar annotations in other documents. This way, the methods and systems provide an efficient, automatic, and enhanced way of adding annotations to the digital version of the document based on the hand-written annotations marked in the printed version of the document.

Exemplary Environment

FIG. 1 shows an exemplary environment 100 in which various embodiments of the disclosure can be practiced. The environment 100 includes a multi-function device 102. Various examples of the multi-function device 102 may be a printer, a scanner, a multi-function peripheral device, or the like. The multi-function device 102 provides one or more functionalities such as printing, scanning, imaging, copying, and so on. In context of the present disclosure, the multi-function device 102 provides a functionality of adding one or more annotations from a printed document to a digital version of the document. Exemplary annotations may include notes/comments, highlighted text, strikethrough text, underlined text, encircled text, an arrow indicating towards a section where a particular paragraph or sentence should be moved, a caret annotation to insert a word or phrase within a line or texts, and so on.

In operation, a user 104 working on a digital version of a document 106 such as a client report, submits the document 106 to another user, for example to a reviewer 110, for review. The document 106 includes content in the form of text, image, graphics, or a combination thereof and can be in any format as known or later developed. The user 104 either submits the document 106 via email or may first take a printout of the document 106 and then submits a printed version of the document 108 to the reviewer 110 for review. In case where the user 104 submits the document 106 via email, the reviewer 110 first prints the document 106 for review. In context of the current disclosure, the user 104 provides the printed version of the document 108 to the reviewer 110 for review and the reviewer 110 reviews the printed version of the document 108. Here, the reviewer 110 reviews the document 108 and adds his comments or notes in the form of one or more annotations in the document 108. The reviewer 110 can typically use any writing object such as pen, pencil, marker, etc., to add annotations. The annotations are hand-written annotations and can be in the form of textual annotations and non-textual annotations. This way, the reviewer 110 manually finishes reviewing the printed version of the document 108 and returns the document 108 including the annotations to the user 104. Subsequently, the user 104 wishes to update or revise the original digital version 106 of the document based on the annotations i.e., reviewer's comments, without referring to the printed version 108 of the document. The user 104 submits the printed version 108 of the document that includes the annotations to the multi-function device 102 such that the annotations are automatically added to the digital version 106 of the document.

In context of the current disclosure, the multi-function device 102 first scans the printed document 108 having one or more annotations and generates a corresponding scanned document. The user 104 further submits the digital version of the document 106. The multi-function device 102 then compares the digital version 106 and the scanned document to identify the annotations. The multi-function device 102 extracts the annotations and adds the extracted annotations to the digital version 106 of the document, resulting in a new digital version of the document. In particular, the multi-function device 102 compares a confidence value of each annotation with a pre-defined confidence value to determine the accuracy of identification of each annotation. The annotations which are identified accurately are embedded as texts, whereas annotations that are not accurately identified are embedded as images in the digital version. The new digital version of the document includes the annotations i.e., reviewer's comments. The user 104 can make changes in this new digital version to finalize the document. Here, the changes done by the user 104 are fed back to the multi-function device 102 that enhances the performance of the multi-function device 102 to identify the annotations more accurately at later stages or for upcoming documents.

This way, the user 104 can directly add the annotations in the digital version of the document 106 and obtain the new digital version of the document having annotations. The user 104 can make any needed changes in the new digital version of the document based on the added annotations. For instance, the user 104 can revise the document, delete all the annotations from the new digital version of the document, and submit the clean version to a client, for example.

Although FIG. 1 is discussed with respect to a scenario where a user (who submits a document) requires another user (who reviews the document) to review his document. In such scenarios, the user and the reviewer are different people. But the disclosure is also applicable for scenarios where the user self-reviews the document. In such cases, the user and the reviewer are the same person.

Exemplary System

Figure 2:
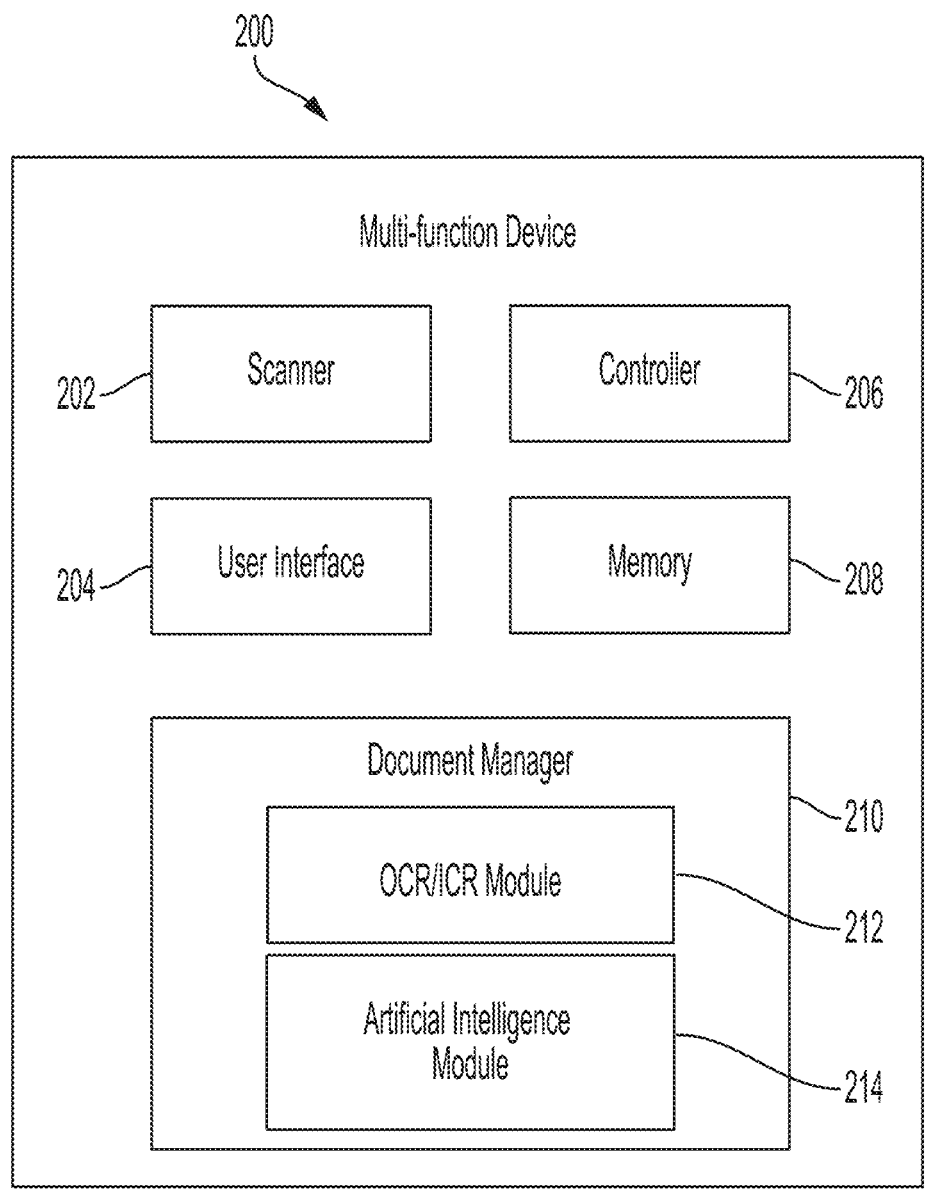
FIG. 2 is a block diagram illustrating various components of a multi-function device, in accordance with an embodiment of the present disclosure.

FIG. 2 is a block diagram illustrating various components of a multi-function device (MFD) 200 for implementing the current disclosure. As shown, the multi-function device 200 includes a scanner 202, a user interface 204, a controller 206, a memory 208, and a document manager 210. The document manager 210 further includes an OCR/ICR module 212 and an Artificial Intelligence (AI) module 214 to perform various functions. However, all the functionalities of the OCR/ICR (Optical Character Recognition/Intelligent Character Recognition) module 212 and the AI module 214 can be incorporated in the document manager 210 without departing from the scope of the current disclosure. The components 202-214 are connected to each other via a conventional bus or a later developed protocol. And the components 202-214 communicate with each other for performing various functions of the present disclosure. The multi-function device 200 may further include additional component(s) as required to implement the present disclosure.

The implementation begins when a user working on a digital version of a document wishes to review the document. The user may review the document either himself or may submit the document to another user (i.e., a reviewer) for review. In context of the current disclosure, the user submits the document to the reviewer for review. In particular, the user prints the document to hand over a printed version of the document to the reviewer such that the reviewer can write or scribble on the document to provide his inputs/review comments. The comments provided in the document may be called as annotations. In one example, the annotations include hand-written textual annotations such as comments or notes. In another example, the annotations include hand-written non-textual annotations such as underlined text, circled text, strikethrough text, and so on. The annotations may include a combination of textual and non-textual annotations. Once the review is complete, the reviewer shares the printed version of the document having the one or more annotations with the user.

Once received, the user submits the printed version of the document having the one or more annotations at the multi-function device 200 for adding/embedding the annotations from the printed version to the digital version of the document. The multi-function device 200 then initiates processing of the printed version of the document.

Upon receiving, the scanner 202 scans the printed version of the document having the one or more annotations to obtain a scanned document. The scanned document can be temporarily stored in the memory 208. The multi-function device 200 then obtains the digital version of the document. The digital version may be fetched from the memory 208, where the document may be stored when the user printed the document to hand over the printed version to the reviewer. Alternatively, the user may submit the digital version of the document via email at the multi-function device 200. The user may also access a cloud location via the user interface 204 to fetch the digital version of the document saved at a cloud location. The digital version may also be stored temporarily in the memory 208.

Once the scanned document and the digital version of the document are obtained, the OCR/ICR module 212 first converts the scanned document to a searchable and/or editable format. In some cases, where the digital version of the document is also in a non-searchable format such as Portable Document Format, the OCR/ICR module 212 converts the digital version too in a searchable format. Once the two documents are in the searchable format, the document manager 210 compares the two documents for identification of the one or more annotations. In other words, the document manager 210 compares the digital version of the document (without annotations) with the scanned document (with the one or more annotations) for identification of the one or more annotations.

The document manager 210 may use one or more suitable image processing algorithms for the identification of the one or more annotations. For instance, first, an image processing algorithm may obtain raster files corresponding to the scanned document and the digital version of the document and then compare the pixel values for pixels of the raster file of the scanned document with the pixel values for pixels of the raster file of the digital version of the document. In an example, an image processing algorithm may XOR or subtract pixel value of each pixel in the digital document with pixel value of corresponding pixel in the scanned document to identify the differences. The differences will be the changes or the annotations that are made on top of the original digital document. In XORing, if pixel values of the two documents are same then an output obtained is '0', however, if the pixel values are different, then the output is '1'. Thus, the pixels containing annotations can be easily identified. This way the one or more annotations are identified.

For example, the extraction of the annotation can be done by normalizing the image (to handle any scan artifacts) and simply XORing or subtracting the pixel values between the original content with the scanned pages to identify the differences i.e., the annotations. The differences represent the changes that are made by the user on top of the original document.

Figure 3A:
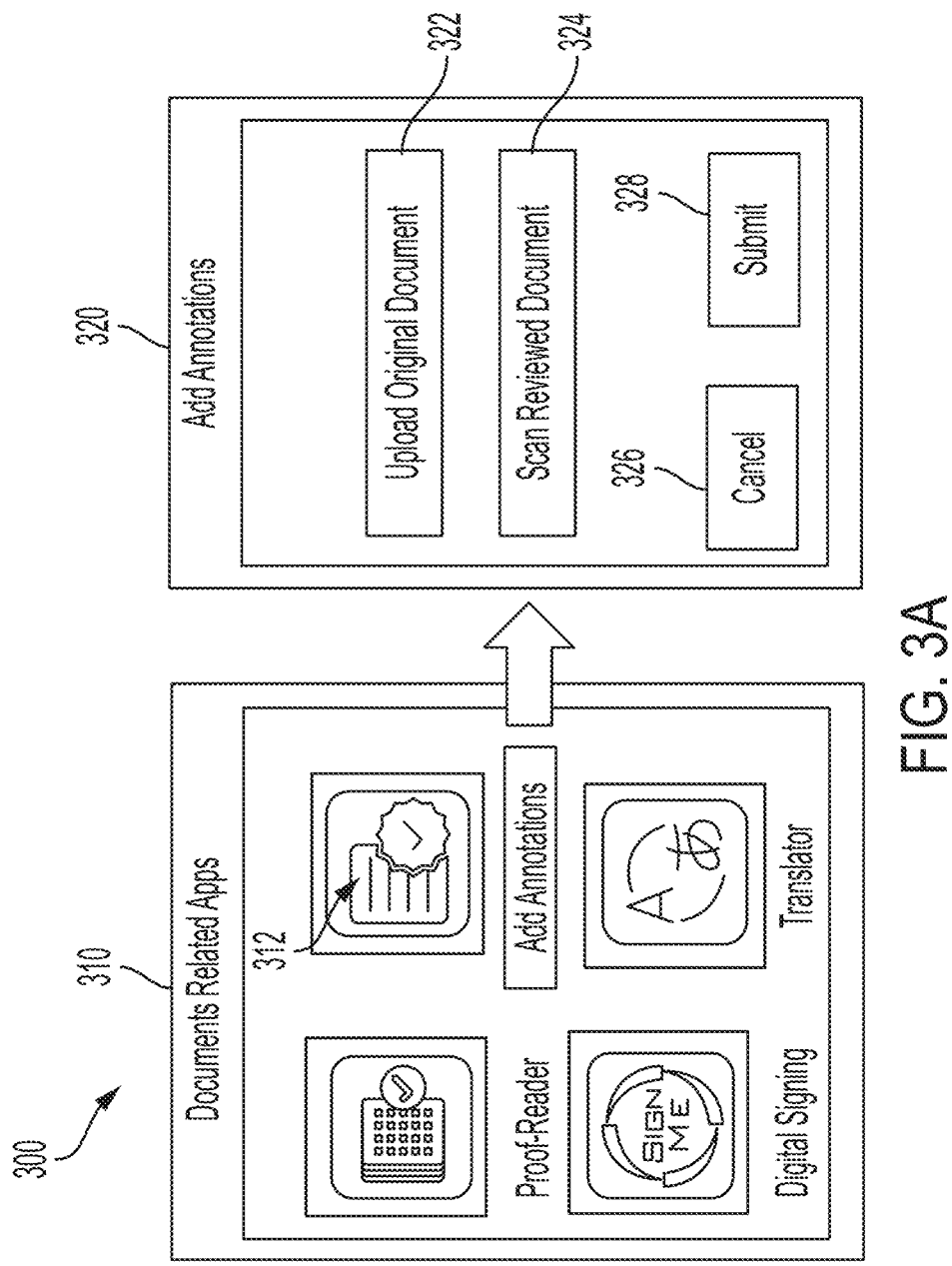
FIGS. 3A-3D are exemplary snapshots showing implementation of the present disclosure.
Figure 3B:
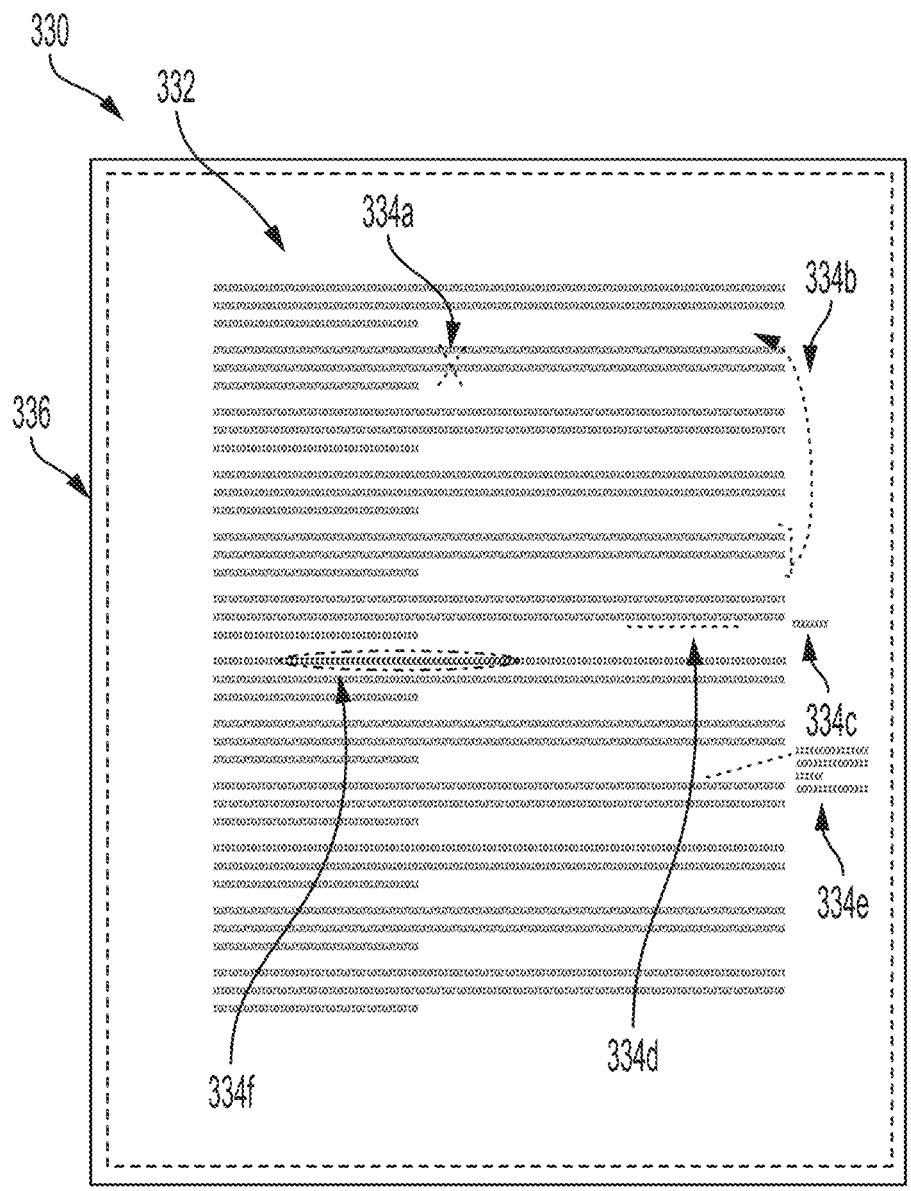

The resulting image as shown in FIG. 3B is the result of applying the 'difference' filter between two layers i.e., two document layers, the base layer is the original document and the layer on top is the annotated version, i.e., the document with annotations. The difference is calculated for each of the pixel between the two layers using the formula:

Result=|Base−Annotated|

Before applying the difference filter, the document manager 210 ensures that both the images (original and annotated) are aligned with each other. This can be accomplished by detecting unique features on both the documents and determining the alignment of both the document and scaling them so that they are of the same dimensions. For example, height and width of the document in pixels may be used to determine the dimension of the document. To this end, height and width of the original document in pixels may be compared with the height and width of the annotated document in pixels in order to check the alignment. The unique features may be images in the document, bold content, the way content is formatted, color of textual content, etc., that can be detected and checked again in the scanned document.

Once identified, the AI module 214 extracts the one or more annotations from the scanned document for adding the extracted annotation to a corresponding location in the digital version of the document. Details related to extraction and addition of annotations from the scanned document to the digital version are provided in below sections. The AI module 214 can be any suitable module/model/algorithm such as a convolutional neural network model, YOLO model (i.e., 'You Only look Once' Model), or any existing or later developed AI model that can be trained to detect and/or categorize various types of annotations as per the scope of the current disclosure.

The AI module 214 first segregates the extracted one or more annotations based on the confidence value of the one or more annotations. The confidence value is an estimate of accuracy with which the OCR module 212 is able to identify the hand-written annotation. The OCR module 212 provides this accuracy estimate or confidence value for all the annotations. The confidence value of each annotation is compared to a pre-defined confidence value. The annotations having a confidence value higher than the pre-defined confidence value are the annotations that are accurately identified by the OCR module 212. The annotations having a confidence value lower than the pre-defined confidence value are not accurately identified by the OCR module 212. As a result, the AI module 214 lifts up the accurately identified annotations and embeds these annotations as text in the digital version of the document, whereas the AI module 214 lifts up and embeds the unidentified annotations as an image in the digital document. In other words, if the confidence value of an annotation is greater than the pre-defined confidence value, the annotation is embedded as text whereas if the confidence value of the annotation is less than the pre-defined confidence value, it is embedded as an image in the digital document. The pre-defined confidence value is a pre-set value of the OCR module 212. In some scenarios, the pre-defined confidence value can be set or adjusted by the user or an administrator.

The AI models discussed above are trained to detect annotations and recognize textual content. These models provide a degree of confidence to predict that there is a particular annotation in a specific location. For example, the AI model predicts with 90% confidence that the identified item in a specific location is an 'insertion caret' (i.e., A). In further example, the AI model may predict and identify the same object as a '7' (caret rotated by 90 degrees) but with 20% confidence.

Once the annotations are categorized into relevant categories i.e., textual or non-textual annotation, the AI module 214 identifies location of the one or more annotations in the digital version of the document. In other words, the AI module 214 identifies the position where each annotation is to be added in the digital version of the document. For this, the AI module 214 identifies association of the one or more annotations with content of the digital version of the document. More specifically, the AI module 214 identifies if the annotations are to be linked to any specific content in the digital version of the document. For example, if the annotations are associated or linked to any specific word, a phrase, a paragraph, a page, etc., in the digital version of the document. The content to which each annotation is associated may also be called as an anchor point.

For example, if extracted annotations include an opening bracket and a closing bracket, i.e., '[' and ']', and the annotation '[' is placed at the beginning of a paragraph, say $3^{rd}$ paragraph of the $1^{st}$ page and the annotation ']' is placed at the end of the $3^{rd}$ paragraph of $1^{st}$ page. Then, the AI module 214 identifies that the annotations '[' and ']' are associated to the $3^{rd}$ paragraph on the $1^{st}$ page of the digital version of the document. In another example, if the extracted annotation is a highlighted text, which spans from $3^{rd}$ word to the $7^{th}$ word of $8^{th}$ line of the $2^{nd}$ page, then, the AI module 214 associates the highlighted text to the line segment spanning from $3^{rd}$ to $7^{th}$ word of the $8^{th}$ line on $2^{nd}$ page of the document. This way the AI module 214 identifies the association of each annotation to the content of the digital version of the document.

In some cases, the AI module 214 is unable to associate an annotation to a word, sentence, phrase, or paragraph(s) in the digital version of the document for one or more reasons. For example, the annotations are not clearly marked or linked to the content in the scanned document, and so on. In such cases, the AI module 214 associates the annotation marked in the scanned document to a corresponding page and position in the digital version of the document. For example, if an annotation including an arrow is included towards the top right corner of a $2^{nd}$ page in a scanned document and the AI module 214 is unable to tag the arrow to a particular word, phrase, sentence or paragraph(s) in the digital version of the document, the annotation is tagged to the $2^{nd}$ page of the digital version of the document. The AI module 214 can also be trained to associate annotations to appropriate content in the digital version of the document. For example, if an extracted annotation is "define working of USB" and upon analysis of the digital document, it is identified that the digital document includes a phrase "universal serial bus" at the corresponding location. Then, the AI module 214, based on its training data, associates the annotation "define working of USB" to the identified phrase "universal serial bus" in the digital document.

Once the association of all the annotations is identified, the AI module 214 associates the extracted one or more annotations to the associated content in the digital version of the document. At this stage, the AI module 214 adds the annotations in the digital version of the document. Adding the one or more annotations means attaching/anchoring the extracted one or more annotations to the associated word, phrase, sentence, paragraph(s), or page in the digital version of the document. In other words, if a word in the scanned document is circled, then the annotation (circle) is added to the same word in the digital version of the document such that any revisions made in the digital document do not move the position of the circle with respect to the word. That means the word remains circled irrespective of any editing/changes done by the user in the digital version of the document. In other words, when the user works on the digital version of the document after the addition of the one or more annotations to the document, the position of annotations is same with regard to its associated content. For instance, if the reviewer circles a paragraph in the scanned document and the annotation is added in the digital version of the document, when the user starts editing this document (say, the user adds a new sentence at the beginning of this paragraph), the position of circle with respect to the paragraph remains same. In this case, if the paragraph is moved to a new position in the document, the annotation i.e., circle moves or shifts along with the paragraph.

Once all the annotations are associated or added to the digital version of the document, the controller 206 generates a new digital version of the document. The new digital version of the document includes all the annotations at positions that are same as that of the position of annotations in the scanned document. Moreover, the annotations added to the digital version of the document are in a searchable format that allows easy editing of the document based on added annotations. So, the user can send the new digital version of the document to his computing device via email. The user accesses the new digital version of the document via the user interface 204. Once sent, the user can make changes or revisions in the document. The changes done by the user in the new digital version are fed to the AI module 214. For instance, if the document includes an annotation where a word 'recorded' is strikethrough and replaced with a new word 'registered'. Here, the AI module 214 may not be able to recognize the word 'registered' for reasons such as bad handwriting, or so on. Therefore, the word 'recorded' is embedded as an image. Once the user makes changes to replace the word 'recorded' with 'registered', the change is recorded and fed to the AI module 214. Similarly, all edits or changes done by the user are fed to the AI module 214 such that in future if any document includes similar annotations, the OCR module 212 can understand the annotation and embed the annotation as text in the digital document. This way the performance of the OCR module 212 is enhanced using the present disclosure. For example, if the user adds any comments/annotations that are not understood or recognized by the multi-function device 200, then the multi-function device 200 monitors the changes made by the user while incorporating the review comments (annotations). The changes made and the correlation with the input annotations allow to train the AI model to correctly and completely recognize the user input annotations and better recognize the text (using OCR) in later stages.

Once the revisions are done, the user can delete the annotations from the new digital version of the document to get a clean version of the document. The user may also store the new digital version of the document at one or more destinations. For example, the user saves the new digital version of the document in the memory 208 for later use or may store the document in one or more storage devices such as hard drive, USB, cloud storage, local server, and so on.

This way, the multi-function device 200 adds the annotations to the original digital version of the document from the scanned document and the user can use the new digital version having the one or more annotations for making any changes.

Exemplary Snapshots

FIGS. 3A-3D are exemplary snapshots showing implementation of the present disclosure.

FIG. 3A is a snapshot 300 showing a user interface 310 of a multi-function device. The user interface 310 provides an application 'Add Annotations' 312 that can be accessed by a user for adding one or more hand-written annotations from a printed document to a digital document. This is useful in a scenario where the user has a printed reviewed document having one or more hand-written comments (i.e., annotations) that are provided by a reviewer, for example, and the user wishes to add the comments to an original digital version of the document. Adding the comments to the digital version can allow the user to make any changes or revisions in the original digital document based on provided comments.

As shown, the user selects the 'Add Annotations' application 312 and a new user interface 320 is displayed. The user interface 320 provides an option 322 to 'upload original document' and another option 324 to 'scan reviewed document'. User clicks on the former option 322 to fetch the original digital version of the document in which the user wishes to import/add the one or more annotations. The user can upload the document from any destination where the document is stored. For example, the user can fetch the document from a cloud location where the document is saved, can access a USB drive to get the document stored there, or can fetch the document from other similar storage devices/destinations.

Once uploaded, the user clicks on the other option 324 to scan the printed document including the one or more annotations. Here the user first places the document in a feeder such as ADH/DADH (Duplex Automatic Document Handler) and clicks the option 324 to initiate scanning. Once done, a scanned document including the one or more annotations is obtained. The scanned document can be optionally converted to a searchable format using an application such as OCR/ICR, for example. Once the documents are uploaded/obtained, the user clicks on submit 328 to initiate the processing. The user can click on cancel 326 anytime during this entire process to end/terminate the processing.

FIG. 3B is a snapshot 330 showing comparison of raster files of the digital version of the document and the scanned document for identification of the one or more annotations. Here, a raster file 332 of the scanned document including annotations 334a, 334b, 334c, 334d, 334e, and 334f (collectively 334) is compared with a digital document 336 to extract the annotations 334. As shown, the digital document (i.e., a base file) is subtracted from the scanned document (i.e., raster file) for extraction of the annotations 334. As a result, the pixels of two documents are compared and annotations 334 are easily identified and/or extracted.

Figure 3C:
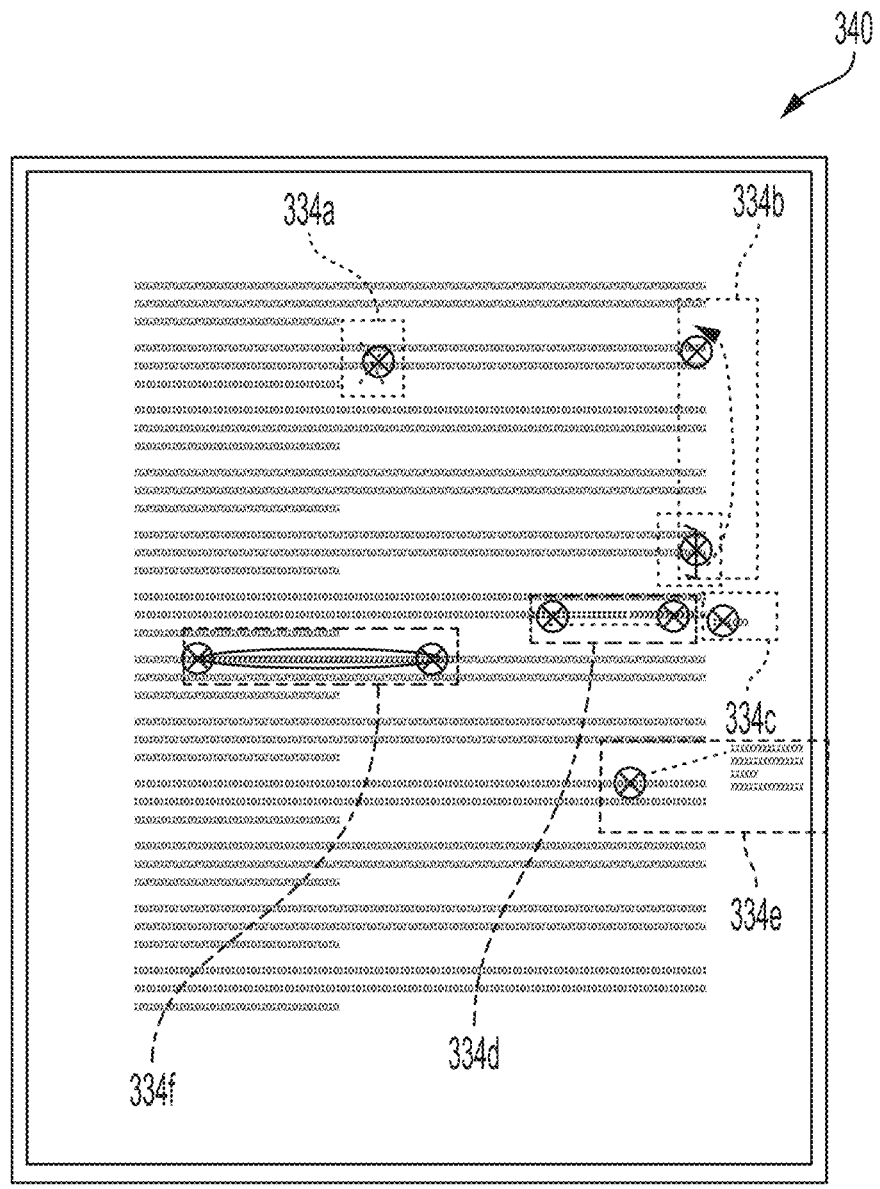

FIG. 3C is a snapshot 340 illustrating identification of category and location of the one or more annotations 334, where the annotations are identified after comparing the two documents.

The extracted annotations 334 are first segregated based on the confidence value of the one or more annotations. For instance, annotations having a confidence value higher than a pre-defined confidence value are segregated from the annotations having a confidence value lower than the pre-defined confidence value. Here, annotation 334e includes a text that is not identified accurately by the OCR module and thus has its confidence value lower than the pre-defined confidence value. The remaining annotations 334a-334d and 334f are non-textual annotations and are accurately identified by the OCR module. Therefore, these annotations have their confidence value higher than the pre-defined confidence value. Subsequently, the association of annotations 334 to the content of the digital document is identified. The annotation 334a is a cross and spans through the $2^{nd}$ paragraph, so the annotation is associated with the second paragraph of digital version of the document. Further, the annotation 334b is an arrow bracket that spans through multiple paragraphs (i.e., starts at paragraph number 2 and ends at paragraph number 5). Accordingly, the annotation 334b is associated with the paragraphs $2^{nd}$-$5^{th}$ on the same page of the digital version of the document. Similarly, the annotations 334d and 334f are associated with the lines segments that are underlined and highlighted, respectively. The annotation 334c is associated with the page as the written text is not linked to any content. And the annotation 334e is associated with a word, where the textual annotation is written.

Once the association of annotations is determined successfully, the annotations are added to the digital document. The annotations are associated with the content of the digital document such that any movement of the content does not change the position of annotation with respect to the associated content.

Figure 3D:
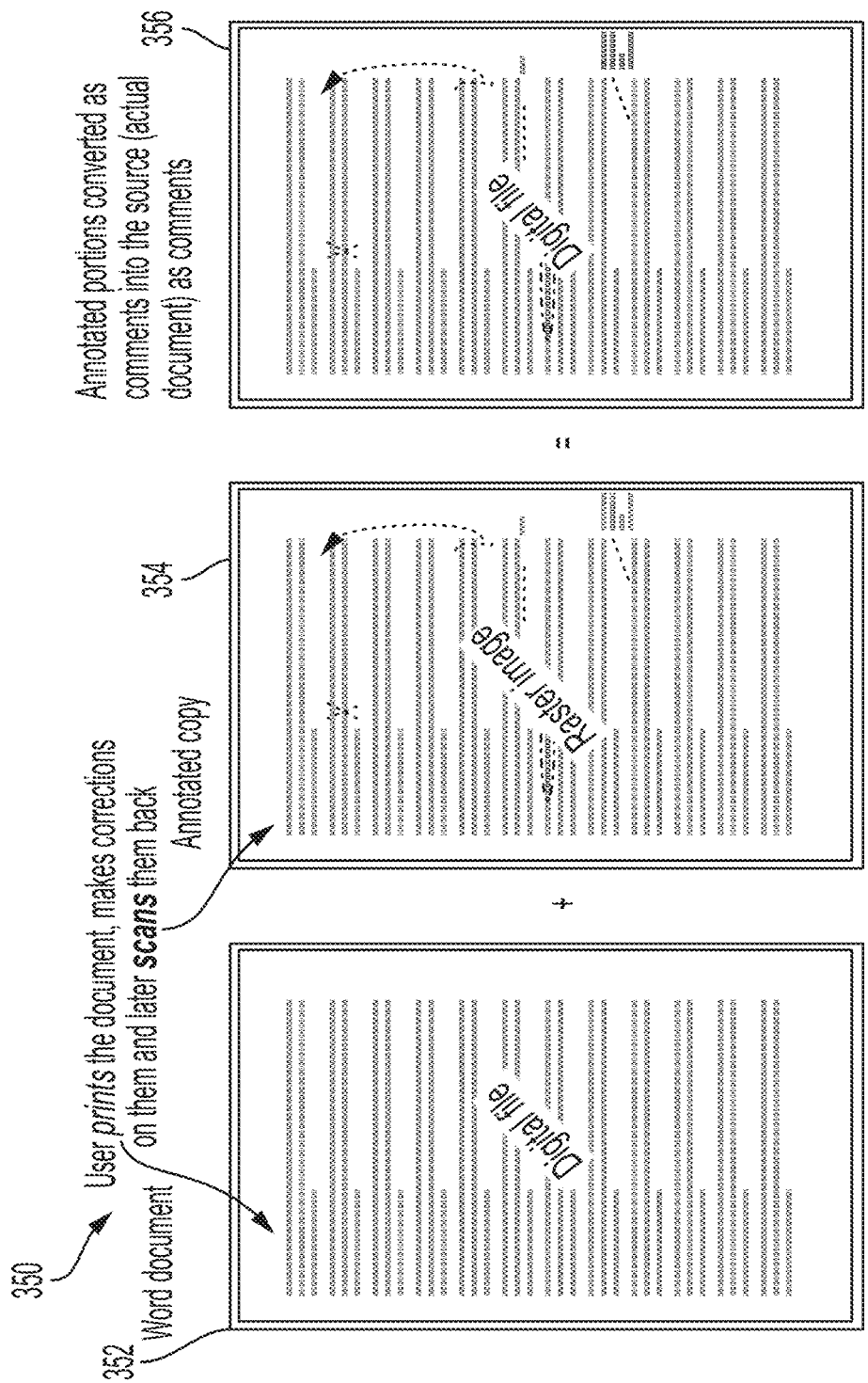

Finally, FIG. 3D is a snapshot 350 showing a new digital version 356 of the document that is obtained after comparing an original digital version 352 of the document to a scanned document 354 including one or more annotations. As shown, the annotations are added to the new digital version 356 such that a user can use this new version 356 for making any revision or changes in the document based on added annotations.

Exemplary Flowchart

Figure 4A:
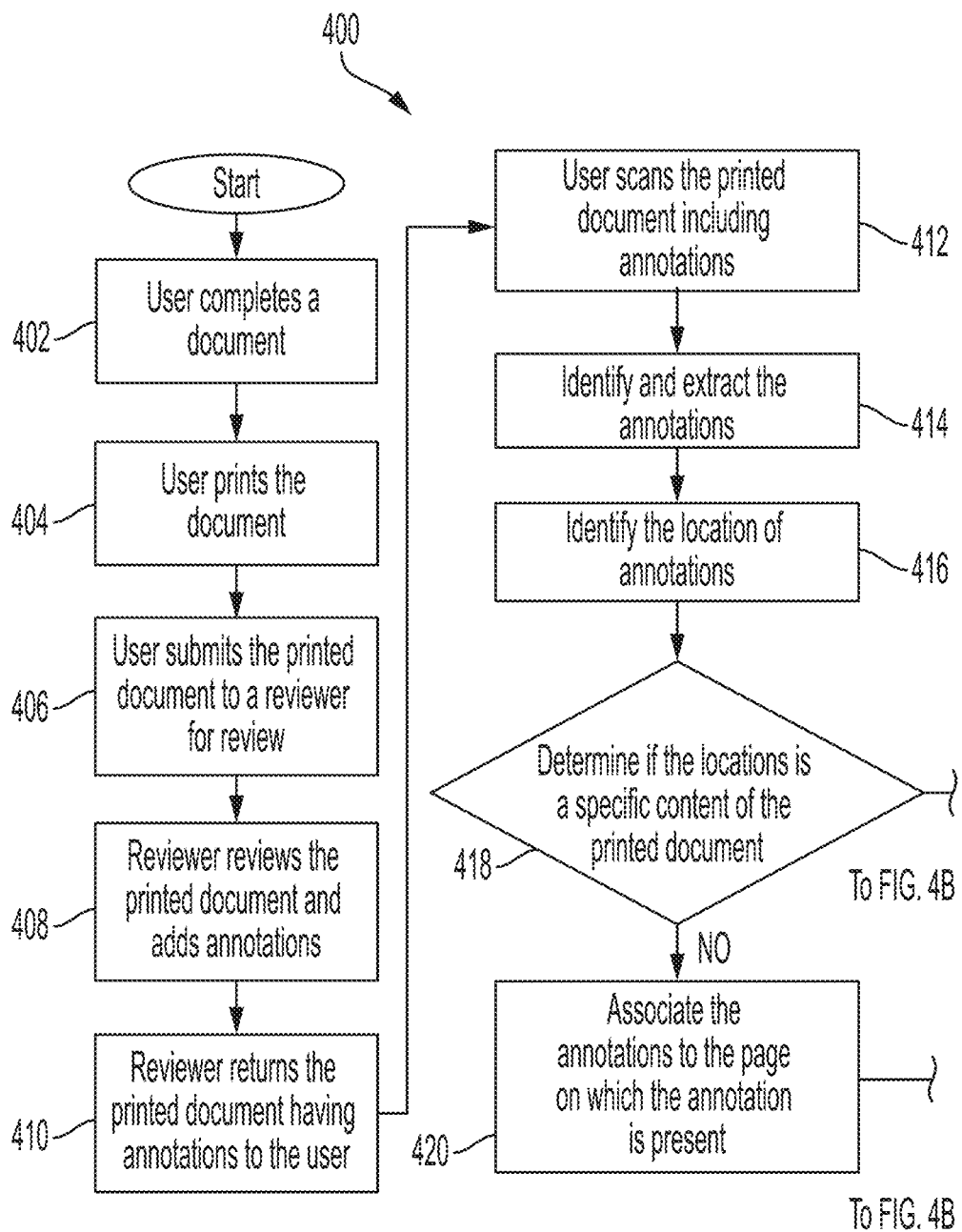
FIGS. 4A and 4B illustrate an exemplary flowchart defining various steps for implementing the present disclosure.
Figure 4B:
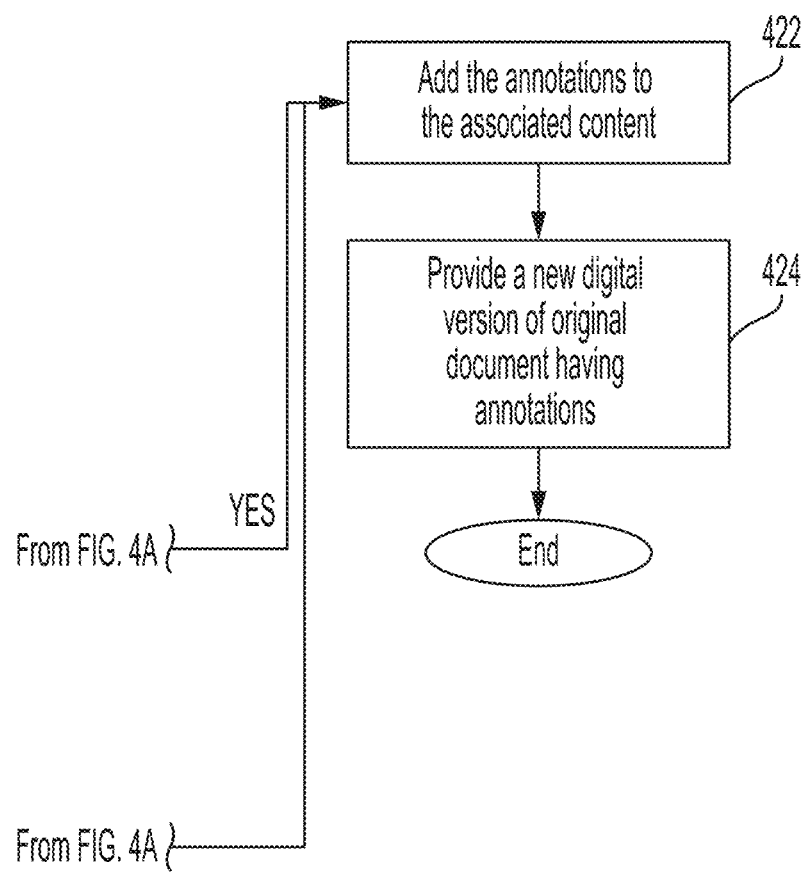

FIGS. 4A and 4B illustrate a review workflow 400 for adding one or more annotations from a printed version of a document to a digital version of a document, according to the present disclosure. The review workflow 400 begins when a user working on a digital document wishes to share the document with a reviewer for review. Once the user completes his work on the digital document at 402, he prints the document at 404. Subsequently, the user submits the printed version of the document to the reviewer for review, at 406. Thereafter, at 408, the reviewer reviews the printed document and adds annotations suggesting changes/editions to be made in the digital document. Once the user reviews the entire document and adds desired annotations, at 410, the user returns the printed document including annotations to the user. Upon receiving the printed document from the reviewer, the user scans the printed document including annotations at the multi-function device, at 412. Once the scanned document is generated successfully, the user obtains the digital document that is stored in the memory of the multi-function device. The user then submits the two documents for comparison and addition of annotations from the scanned document to the original digital version of the document. The multi-function device initiates comparison of the two documents to identify and extract the annotations, at 414. Once the annotations are extracted, the AI module compares the confidence value of each annotation to a pre-defined confidence value. The annotations having a confidence value higher than the pre-defined confidence value is lifted as text, whereas the annotations having a confidence value lower than the pre-defined confidence value are lifted as image. Thereafter, the AI module identifies the association of each annotation to the content of the digital content at 416. At 418, it is determined if the identified association is related to a word, paragraph, image, figure, etc., if yes, the annotations are added in the digital document according to the identified anchor points. If the AI module is unable to identify a specific content where the annotation is to be added, the AI module associates the annotation to a corresponding page of the original document, at 420. This way, all the annotations are added to the digital version based on the identified associations of annotations to the digital content, at 422.

Once the annotations are added successfully, at 424, a new digital version of the document including annotations is displayed to the user via the user interface of multi-function device. Once displayed, the user can revise the document based on the added annotations. The revisions are fed back to the AI module such that the AI module is trained to identify the fed changes in upcoming documents. Also, the user can share the new digital version of the document to various destinations. This way, the user can easily add the hand-written annotations marked in the printed document by the reviewer to the original digital version of the document.

In the above discussed workflow, the reviewer returns the reviewed printed document having annotations to the user for further processing. But the printed document having annotations can be processed further by the reviewer such that the reviewer shares the finally obtained new digital version having annotations with the user.

Exemplary Method Flowchart

Figure 5:
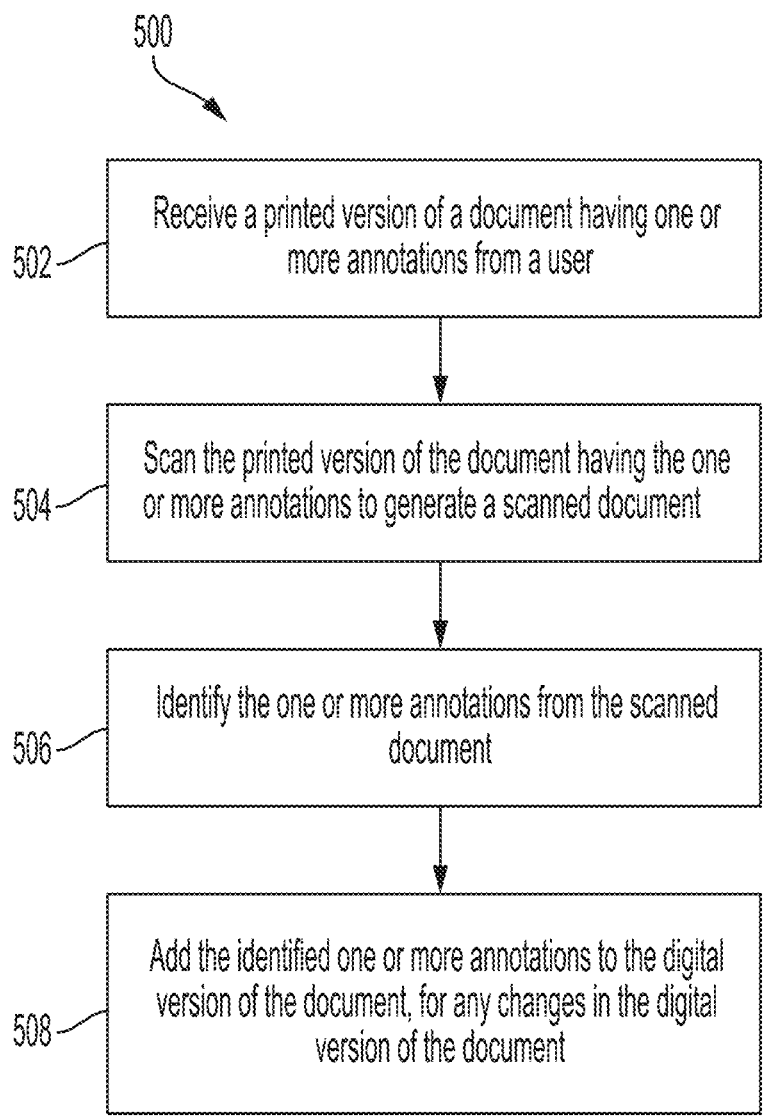
FIG. 5 is a method flowchart for adding one or more annotations from a printed document to a digital version of the document, in accordance with an embodiment of the present disclosure.

FIG. 5 is an exemplary method flowchart 500 for adding annotations from a printed version of a document to a digital version of the document. The method 500 may be implemented at a multi-function device, such as the multi-function device 102 of FIG. 1, or the multi-function device 200 of FIG. 2. However, the method 500 can be implemented at any equivalent device with scanning functionality, and so on.

The method 500 begins when a user working on a digital version of a document submits the document to another user, for example reviewer, for review. The user either submits the document via email or may first take printout of the document and then submits the printed version of the document to the reviewer for review. As per the current disclosure, the reviewer reviews the document on the printed version. Therefore, in cases where the user submits the document via email, the reviewer first prints the document and then initiates the review on the printed version. During the review, the reviewer adds his comments or notes in the form of annotations in the printed document. The annotations are hand-written annotations and can be in the form of textual annotations and non-textual annotations. This way, the reviewer manually finishes reviewing the printed version of the document and returns the printed version of the document including the annotations to the user.

At 502, the user receives the printed version of the document having one or more annotations, where the annotations represent the review comments of the reviewer. Upon receiving the document, the user submits the reviewed printed version of the document at the multi-function device for scanning. At 504, the printed version of the document including the one or more annotations is scanned to obtain a scanned document. The scanned document can be in any format such as PDF, JPG, or the like. The scanned document with the annotations is further converted into editable and searching format. A number of techniques such as OCR or ICR may be employed for converting the scanned document into searchable format.

Subsequently, the original digital version of the document is obtained. In one example, the digital document may be stored and can be obtained directly from the memory of the multi-function device or other locations. In another example, the digital version of the document may be submitted by the user, for example, the user may upload the digital version of the document.

Once obtained, at 506, the one or more annotations are identified from the scanned document. To identify the one or more annotations, the digital version of the document is compared with the scanned document. In one example, the scanned document and the digital version are converted into raster format, where pixel values of both the documents are compared to identify the annotations. In another example, the scanned document and the digital version can be directly compared to identify the annotations. Any suitable technique or approach may be used to compare the two documents for the identification of the one or more annotations.

Then, the identified annotations are extracted. To accomplish this, the confidence value of each annotation is identified. The confidence value is an estimate of accuracy with which the OCR module is able to identify the hand-written annotation. The annotations having a confidence value higher than a pre-defined confidence value are the annotations that are accurately identified by the OCR module and thus can be lifted and embedded as text in the digital document. But, the annotations having a confidence value lower than the pre-defined confidence value are not accurately identified by the OCR module. As a result, these annotations are embedded as an image in the digital version of the document. Thereafter, the location of each annotation is identified. To accomplish this, association of the annotation with the content in the digital document is identified. For example, the association of the annotation with the line, phrase, sentence, paragraph, etc., is identified. Once identified, the annotation is associated or attached to the identified content.

Once the annotations are associated with the appropriate content of the digital version of the document, at block 508, the one or more annotations are added in the digital version of the document. For instance, annotations having a confidence value higher than the pre-defined value are added as text and remaining annotations are added as an image in the digital version of the document. Once the annotations are added successfully, a new version of the digital document is obtained that includes the annotations. The new digital version with the annotations can be sent to the user via email, for example. The user can make needed changes in the new digital version to update the document. The changes done by the user are fed back to the AI module so that the system can learn the made changes for upcoming documents. Once all the changes are made, the user may delete the annotations from the document and can get a clean version of the document. The user can share this final version with required stakeholders such as client, manager, etc.

The method 500 can be implemented in the form of a non-transitory computer-readable medium storing instruction, which when executed by one or more processors cause the one or more processors to: receive a printed version of a document including one or more annotations from a user; scan the printed version of the document comprising the one or more annotations to generate a scanned document; identify the one or more annotations from the scanned document; and segregate the one or more annotations into textual or non-textual annotation based on a calculated confidence value of each annotation; and add the identified one or more annotations to the digital version of the document based on the confidence value of the one or more annotations, for any changes in the digital version of the document based on the one or more annotations.

Exemplary Implementation

Figure 6A:
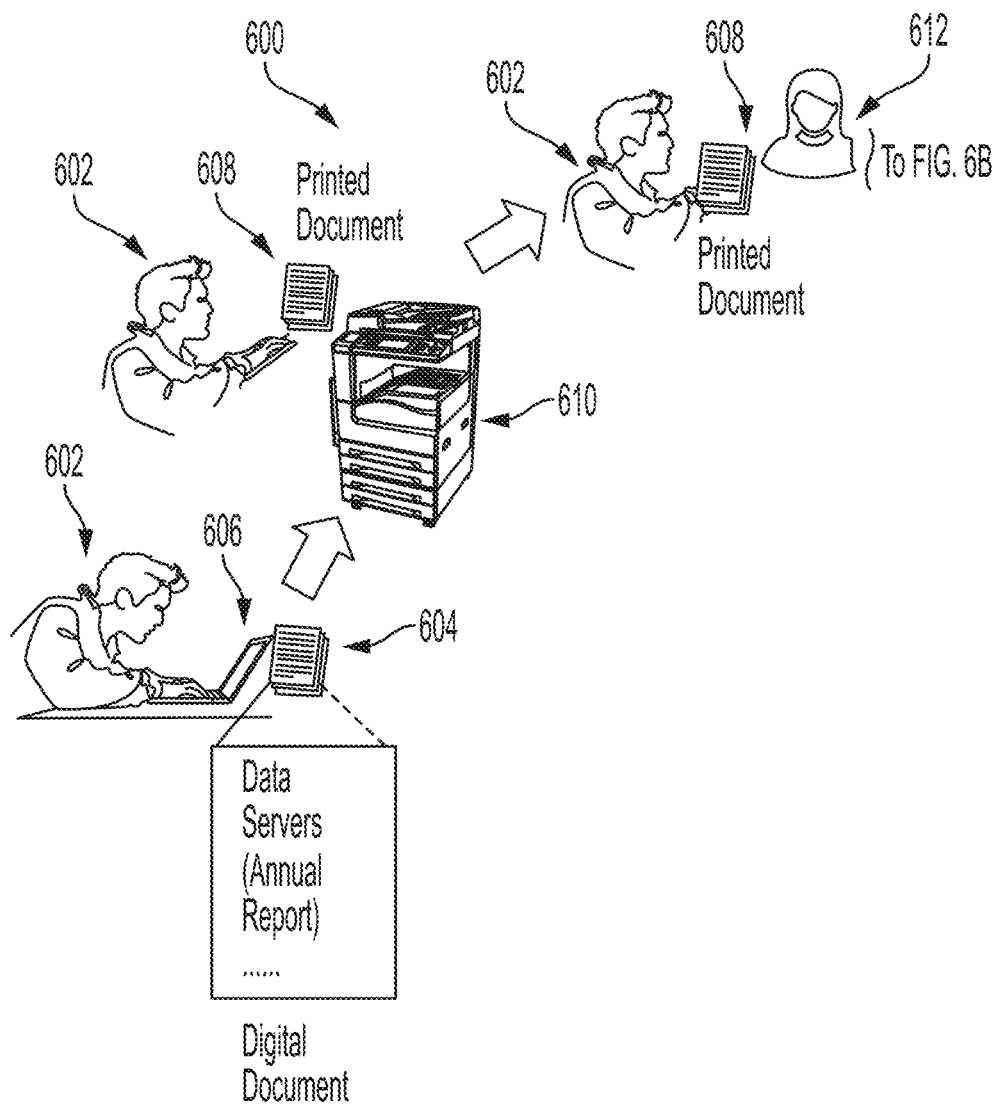
FIGS. 6A and 6B show an exemplary environment for implementing the present disclosure, in accordance with an embodiment of the present disclosure.
Figure 6B:
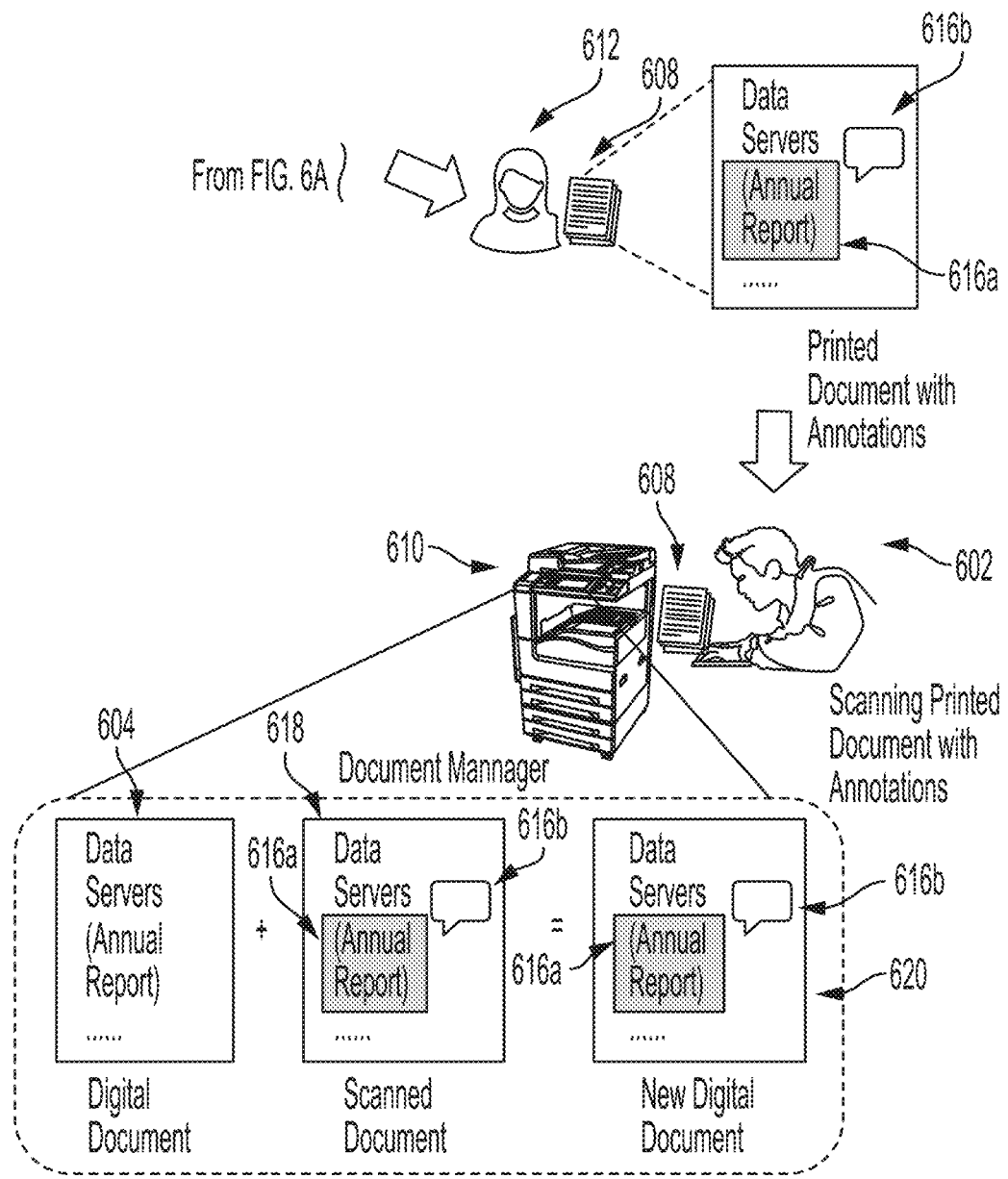

FIGS. 6A and 6B show an exemplary environment 600 and implementation of the present disclosure. The environment 600 includes a user 602 working on a document, a reviewer 612 reviewing the document to provide his comments/annotations in the document, and a multi-function device 610 for handling the document with annotations.

As clearly shown, the user 602 is working on a digital version of a document 604 on his computing device 606. The document 604 represents an annual report. Once the user 602 completes his work, he submits the document 604 at the multi-function device 610 for printing. The multi-function device 610 prints the document and a printed version of the document 608 is obtained. The user 602 collects the printed version 608 and submits it to the reviewer 612 for his review. Alternatively, the reviewer 612 can directly print the document. This may happen when the user 602 submits the document 604 via email and the reviewer 612 prints the document to review on the printed version 608.

Once the printed version 608 is obtained, the reviewer 612 reviews the printed document 608 and adds his comments in the form of one or more annotations to the document 608 such as 616*a* and 616*b*. Here, the annotation 616*a* is a highlighted text '(Annual Report)' and the annotation 616*b* is a comment provided adjacent to the annotation 616*a*. While only two annotations 616*a-b* are shown, there can be any number of annotations provided in the printed document 608. Upon adding the annotations 616*a-b* or post completion of the review, the reviewer 612 returns the printed document 608 including annotations 616*a-b* to the user 602. The user 602 wants to update the document 604 based on the reviewer's comments given in the document 608. Subsequently, the user 602 submits the document 608 at the multi-function device 610. The multi-function device 610 first scans the printed document 608 including annotations 616*a-b* to get a scanned document 618. This scanned document 618 is then compared with the original digital version 604 to get a new digital version of the document 620. The new digital version 620 includes the annotations 616*a-b* at the same position as that of the scanned document 618/printed document 608. This way, the user 602 can do any revisions in the new digital version 620 and finalize the annual report, and share it further with his team members/seniors.

The present disclosure discloses methods and systems for adding annotations from a printed document to a digital document. The methods and systems allow a reviewer to use a natural review process for reviewing a document, which is to use paper/printed version and leave hand-written comments in the document. The process is faster and does not have a lot of digital dependencies. Moreover, the methods and systems allow a user to merge/add the comments/annotations provided in the printed version into the original digital version of the document. As a result, the user need not view the annotations/comments side-by-side and make corrections in the original digital document, as the digital document already has these comments as annotations. The annotations are searchable, therefore, it becomes easy for the user to make changes in the document based on provided comments/annotations. Further, the annotations can be deleted from the digital document, thus the final document is a clean copy. Moreover, the overall size of the document is reduced after deleting the annotations. To summarize, the methods and systems allow a reviewer to easily review the printed document and conveniently add desired annotations using pen, pencil, highlighter, etc., and at the same time, the methods and systems also allow the user working on the document to easily incorporate the changes in the digital version of the document without referring to the printed document. Therefore, the present disclosure enhances the overall user experience and review workflow for reviewing the documents.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Although the disclosure is discussed with respect to a multi-function device, but the disclosure may be implemented in form of a mobile app which can be installed on a user device such as a mobile device. The mobile app is configured such that the app handles a printed document having one or more annotations. Once the user received the printed document having one or more annotations marked by a reviewer, the document can be scanned via a camera of the mobile device. In such cases, the mobile app accesses the camera of the mobile device for scanning and hence a scanned document is obtained. Once the scanned document is obtained, the mobile app compares the scanned document and an original digital version of the document to identify the annotations marked in the scanned document. Then, the identified annotations are extracted and embedded or added to the original digital document. Once all the annotations are added from the scanned document to the digital document, the user obtains a new digital version of the original document. He can send the new digital version via email to his computing device, say laptop. Accordingly, he can quickly and conveniently revise or make changes in the document based on the added annotations. In current implementation, the mobile app includes an AI module that can extract and add the annotations at an appropriate location in the original digital document. In this case, the mobile app may include an application programming interface (API) that allows addition of the annotations to the digital document.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, scanning, identifying, extracting, adding, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for adding annotations from a printed version of a document to a digital version of the document, the method comprising:
   receiving the printed version of the document having one or more annotations from a user;
   scanning the printed version of the document comprising the one or more annotations to generate a scanned digital version of the document;
   for each of the one or more annotations, identifying first textual content of each of the one or more annotations from the scanned document using optical character recognition, wherein the first textual content comprises one or more characters;
   for each of the one or more annotations, determining a calculated confidence value of accuracy of the identifying the first textual content; and
   for each of the one or more annotations having a calculated confidence value above a predetermined threshold confidence value:
      identifying a location to associate each of the one or more annotations in the digital version of the document, the identifying using a trained machine learning module to recognize the first textual content of each of the one or more annotations as corresponding to second textual content of the digital version of the document, wherein the second textual comprises one or more characters and differs from the first textual content; and
      adding each of the one or more annotations to the digital version of the document at the identified location, wherein for one or more of the annotations having a calculated confidence value above the predetermined threshold confidence value, adding the annotation further comprises anchoring the annotation to an associated word, phrase, sentence, paragraph or page in the digital version of the document.

2. The method of claim 1, wherein the one or more annotations are hand-written annotations.

3. The method of claim 1, further comprising extracting the one or more annotations from the scanned document.

4. The method of claim 1, further comprising embedding any of the one or more annotations with confidence values less than the predetermined threshold confidence value as image in the digital version of the document.

5. The method of claim 1, further comprising:
   allowing the user or another user to make changes in a new digital version of the document comprising the one or more added annotations; and
   receiving changes from the user or another user made in the new digital version of the document based on the one or more added annotations.

6. The method of claim 5, further comprising storing the changes made by the user in the new digital version of the document.

7. The method of claim 1, wherein the machine learning module is trained using training data comprising previously generated annotations correlated to digital content.

8. A multi-function device for adding annotations from a printed version of a document to a digital version of the document, the multi-function device comprising:
   a scanner for scanning a printed version of a document having one or more annotations;
   a document manager for:
      each of the one or more annotations, identifying first textual content of the one or more annotations from the scanned digital version of the document using optical character recognition, wherein the first textual content comprises one or more characters;
      each of the one or more annotations, determining a calculated confidence value of accuracy of the identifying the first textual content; and
      each of the one or more annotations having a calculated confidence value above a predetermined threshold confidence value:
         identifying a location to associate each of the one or more annotations in the digital version of the document, the identifying using a trained machine learning module to recognize the first textual content of the one or more annotations as corresponding to second textual content of the digital version of the document, wherein the second textual content comprises one or more characters and differs from the first textual content; and
         adding each of the one or more annotations to the digital version of the document at the identified location, wherein for one or more of the annotations having a calculated confidence value above the predetermined threshold confidence value, adding the annotation comprises anchoring the annotation to an associated word, phrase, sentence, paragraph or page in the digital version of the document.

9. The multi-function device of claim 8, wherein the one or more annotations are hand-written annotations.

10. The multi-function device of claim 8, wherein the document manager extracts the one or more annotations from the scanned document.

11. The multi-function device of claim 8, wherein the document manager sends a new digital version of the document having the one or more annotations added to the user or to another user to make changes in the new digital version based on the one or more annotations.

12. The multi-function device of claim 11, wherein the document manager stores the changes made by the user or the another user in the new digital version.

13. The multi-function device of claim 12, wherein the document manager learns the stored changes made by the user for later identifying one or more other annotations in one or more upcoming scanned documents.

14. The multi-function device of claim 8, further comprising a user interface for allowing a user to upload the digital version of the document for comparison.

15. The multi-function device of claim 8, wherein the machine learning module is trained using training data comprising previously generated annotations correlated to digital content.

16. A non-transitory computer-readable medium storing instruction, which when executed by one or more processors cause the one or more processors to:
receiving a printed version of a document comprising one or more annotations from a user;
scanning the printed version of the document comprising the one or more annotations to generate a scanned document;
for each of the one or more annotations, identifying first textual content of the one or more annotations from the scanned document using optical character recognition, wherein the first textual content comprises one or more characters;
for each of the one or more annotations, determining a calculated confidence value of accuracy of the identifying the first textual content of each of the one or more annotations; and
for each of the one or more annotations having a calculated confidence value above a predetermined threshold confidence value:
identifying a location to associate each of the one or more annotations in the digital version of the document, the identifying using a trained machine learning module to recognize the first textual content of each of the one or more annotations as corresponding to second textual content of the digital version of the document, wherein the second textual comprises one or more characters and differs from the first textual content; and
adding each of the one or more annotations to the digital version of the document at the identified location, wherein for one or more of the annotations having a calculated confidence value above the predetermined threshold confidence value, adding the annotation comprises anchoring the annotation to an associated word, phrase, sentence, paragraph or page in the digital version of the document.

17. The non-transitory computer-readable medium storing instruction of claim 16, wherein the one or more annotations are hand-written annotations.

18. The non-transitory computer-readable medium storing instruction of claim 16, wherein the machine learning module is trained using training data comprising previously generated annotations correlated to digital content.

* * * * *